US012743336B1

(12) United States Patent
Lanka et al.

(10) Patent No.: US 12,743,336 B1
(45) Date of Patent: Sep. 22, 2026

(54) COGNITIVE SELF-HEALING PLATFORM

(71) Applicant: Morgan Stanley Services Group Inc., New York, NY (US)

(72) Inventors: Rajasekhar Lanka, Cumming, GA (US); Prajwal Baliga, Edison, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/304,204

(22) Filed: Aug. 19, 2025

(51) Int. Cl.

| | |
|---|---|
| ***G06F 11/00*** | (2006.01) |
| ***G06F 9/445*** | (2018.01) |
| ***G06F 9/455*** | (2018.01) |
| ***G06F 9/50*** | (2006.01) |
| ***G06F 11/07*** | (2006.01) |
| ***G06F 11/34*** | (2006.01) |

(52) U.S. Cl.
CPC ...... *G06F 11/0793* (2013.01); *G06F 9/44505* (2013.01); *G06F 9/45558* (2013.01); *G06F 9/5072* (2013.01); *G06F 11/3409* (2013.01); *G06F 2009/45562* (2013.01)

(58) Field of Classification Search
CPC ............. G06F 11/0793; G06F 11/3409; G06F 9/44505; G06F 9/45558; G06F 9/5072; G06F 2009/45562
USPC ........................................................ 714/1–57
See application file for complete search history.

(56) References Cited

U.S. PATENT DOCUMENTS

| | | | | |
|---|---|---|---|---|
| 7,613,105 | B2 * | 11/2009 | Bahl | H04L 43/04 370/242 |
| 8,209,282 | B2 * | 6/2012 | Kern | G06F 11/2058 707/610 |
| 10,601,740 | B1 | 3/2020 | Harding et al. | |
| 10,747,651 | B1 | 8/2020 | Vanderwall et al. | |
| 10,977,155 | B1 | 4/2021 | Muras et al. | |
| 10,986,012 | B1 | 4/2021 | Cote et al. | |
| 11,113,175 | B1 | 9/2021 | Adamo et al. | |
| 11,481,310 | B1 | 10/2022 | Panchev et al. | |
| 11,630,719 | B1 * | 4/2023 | Kottapalli | G06F 11/079 714/47.3 |
| 11,775,377 | B2 * | 10/2023 | Guo | G06F 11/0751 714/4.11 |

(Continued)

*Primary Examiner* — Sarai E Butler
(74) *Attorney, Agent, or Firm* — K&L Gates LLP

(57) ABSTRACT

A computer-implemented cognitive self-healing system for a distributed computing environment includes one or more computing nodes configured to monitor requests and collect telemetry data, including CPU utilization, memory utilization, network throughput, and session-level user experience metrics. A machine learning process comprising one or more models analyzes the telemetry data to identify operational performance issues based on patterns learned from historical, synthetic, and simulated data. In response, the system generates a remediation directive comprising a machine-readable set of executable instructions specifying a modification to a computing environment configuration state. One or more autonomous software agents are instantiated to execute the modification, after which updated telemetry and performance metrics are collected. The machine learning process is updated based on the collected outcome data, enabling continuous improvement in detection and remediation to enhance system resilience, reduce downtime, and optimize operational performance.

20 Claims, 8 Drawing Sheets

(56) References Cited

U.S. PATENT DOCUMENTS

| | | | |
|---|---|---|---|
| 12,056,003 | B1 | 8/2024 | Ramos et al. |
| 2008/0052394 | A1* | 2/2008 | Bugenhagen ......... H04L 45/123 709/224 |
| 2008/0140362 | A1* | 6/2008 | Gross .................... G06F 11/008 703/2 |
| 2009/0158295 | A1* | 6/2009 | Burg ..................... G06F 21/554 718/108 |
| 2012/0158395 | A1* | 6/2012 | Hughes ................... H04L 63/00 703/21 |
| 2018/0322462 | A1 | 11/2018 | Jayaraman et al. |
| 2019/0227915 | A1* | 7/2019 | Anandh .............. G06F 11/3684 |
| 2020/0125901 | A1 | 4/2020 | Pelov |
| 2020/0204451 | A1 | 6/2020 | Marchese |
| 2021/0200950 | A1 | 7/2021 | Basu et al. |
| 2021/0304027 | A1 | 9/2021 | Damodaran et al. |
| 2021/0385124 | A1 | 12/2021 | Roy et al. |
| 2022/0292075 | A1 | 9/2022 | Kudinova et al. |
| 2022/0407960 | A1 | 12/2022 | Willshire |
| 2022/0407961 | A1 | 12/2022 | Willshire et al. |
| 2023/0107316 | A1 | 4/2023 | Ripa et al. |
| 2023/0231762 | A1* | 7/2023 | Wang .................... H04L 41/064 709/224 |
| 2023/0297453 | A1* | 9/2023 | Viclizki ................. G06N 3/045 714/47.2 |
| 2023/0359520 | A1* | 11/2023 | Edamadaka ........ G06F 11/0709 |
| 2024/0028327 | A1 | 1/2024 | Deshpande et al. |
| 2024/0078101 | A1 | 3/2024 | Hykes et al. |
| 2024/0220505 | A1 | 7/2024 | Shashi et al. |
| 2024/0220899 | A1 | 7/2024 | Webb et al. |
| 2024/0338457 | A1 | 10/2024 | Krishman |
| 2025/0209161 | A1* | 6/2025 | Krishnan .............. G06F 40/289 |
| 2025/0342098 | A1* | 11/2025 | Nalam ................ G06F 11/3447 |
| 2026/0003703 | A1* | 1/2026 | Sethi ................... G06F 11/0709 |
| 2026/0039639 | A1* | 2/2026 | Kannery ................. H04L 63/08 |

* cited by examiner

Anomaly Detected
705
Prescriptive Engine Suggested Actions
715
Knowledge Base
710
APE Action Evaluation Loop
720
Consult Performance SLAs
750
Consult Compliance Rules
740
Consult Cost Module
730
Prioritization and Optimal Action Selection
755
Action Execution
765
Feedback Loop
770
XAI
760

COGNITIVE SELF-HEALING PLATFORM

BACKGROUND

Modern computing environments frequently consist of large-scale, distributed systems composed of numerous interdependent components. These environments may include user-facing applications, microservices, application programming interfaces (APIs), databases, data pipelines, infrastructure platforms, and network elements operating across on-premises, private cloud, and public cloud infrastructures. The coordination of these components is necessary to deliver reliable and performant digital services at scale.

Operational workloads in such environments can be highly dynamic, influenced by unpredictable user behavior, seasonal demand variations, software updates, infrastructure failures, and external events. Requests originating from users or systems may traverse multiple processing layers and services before completing, often generating telemetry data at each hop, such as latency measurements, error codes, throughput statistics, and resource consumption metrics.

As these systems grow in complexity and volume, a number of operational challenges can arise. For example, performance degradations in one component can cascade through upstream or downstream dependencies, causing the system to fail silently, without any visible symptoms for users, noticeable slowdowns, or outages, thereby complicating the process of detecting and addressing the issues effectively and in a timely manner. Traditional monitoring systems may produce alerts based on static thresholds, which can be prone to false positives, false negatives, or alert fatigue among operational staff.

Diagnosing the root cause of service disruptions can also be difficult in environments where multiple components are operating concurrently, each generating high volumes of logs, metrics, and events. Manual triage and remediation efforts may be time-consuming, inconsistent, and subject to human error, especially under pressure during high-impact incidents.

Moreover, many systems rely on reactive incident response practices, where performance issues are addressed only after user experience is already affected. This delay can result in breaches of service level agreements (SLAs), reduced availability, and reputational or financial harm. In some cases, automated remediation systems may be deployed, but such systems are often rule-based and lack the contextual awareness or adaptability needed to handle complex or evolving system conditions.

In addition to response-related challenges, operational inefficiencies can arise when computing resources are over- or under-provisioned due to the inability to predict workload patterns accurately. These inefficiencies can increase costs, reduce resilience, or limit the system's ability to respond to sudden demand surges.

SUMMARY

In one general aspect, the present invention is directed to computer-implemented systems and methods for cognitive self-healing of a distributed computing environment. In general, the systems and methods monitor, analyze, and autonomously correct operational performance issues within the environment. The system monitors requests and collects telemetry data from across the distributed computing environment, including request-level and system-level performance metrics. A machine learning process, which can include one or more machine learning models, analyzes the telemetry data to detect or predict operational performance issues based on learned patterns from historical, synthetic, and simulated datasets. In response, the system generates a remediation directive comprising a machine-readable set of executable instructions specifying a modification to a computing environment configuration state. One or more autonomous software agents are instantiated to collectively execute the specified modification, after which outcome data—comprising updated telemetry and performance metrics—is collected. This outcome data is used to update and improve the machine learning process for future detections and remediations.

In some embodiments, telemetry data includes CPU utilization, memory utilization, network throughput metrics, and session-level user experience metrics. The machine learning process may employ transformer-based anomaly detection models, graph neural networks, recurrent neural networks, or reinforcement learning models, and may operate on feature-engineered datasets stored in a dual-zone data lake having both raw and curated data zones.

In certain implementations, the remediation directive is digitally signed and authenticated prior to execution, and the autonomous software agents may be specialized to perform distinct portions of the remediation, such as adjusting hardware resource allocations, modifying software service settings, altering network path parameters, or migrating workloads among computing nodes. Execution can be coordinated by an agent orchestration service to ensure distributed and synchronized application of modifications across the environment.

Additional variations may include confidence-score thresholds for triggering remediation, specialized feedback collection subsystems for fine-grained outcome tracking, and automated model retraining pipelines for continuous adaptation of the machine learning process.

Embodiments of the invention can provide a number of technical advantages. By integrating real-time telemetry ingestion, advanced anomaly detection, and autonomous remediation execution, the system reduces mean time to resolution (MTTR) of performance issues, minimizes service downtime, and improves overall system resilience. The use of specialized autonomous agents allows parallelized and targeted remediation actions, while authentication of remediation directives enhances operational security. The dual-zone data lake architecture supports both high-volume storage and low-latency analytics, enabling more accurate and responsive machine learning models. Continuous feedback loops with model retraining further improve detection accuracy over time, allowing the distributed computing environment to self-optimize in changing workload and fault conditions. These and other benefits that can be realized through embodiments of the present invention will be apparent from the description that follows.

FIGURES

Various embodiments of the present invention are described herein by way of example in connection with the following figures.

DESCRIPTION

The present invention is generally directed to systems and methods for autonomous management of distributed computing environments through real-time monitoring, predictive analytics, and automated remediation. In various embodiments, a cognitive self-healing platform implements continuous observation of system conditions, detects potential service degradations before they occur, and initiates corrective actions without human intervention. By integrating multi-level monitoring, data-driven analysis, and adaptive learning, the platform provides a framework for improving operational resilience, service availability, and performance under dynamic workloads.

In some embodiments, an enterprise, particularly one operating large and complex computer systems and platforms, may use the cognitive self-healing platform to improve the performance, responsiveness, and reliability of its computing infrastructure. Such enterprises may operate client-facing applications that can include, for example, public or private websites, mobile applications, online transaction portals, interactive dashboards, or other network-accessible user interfaces. Improvements may include reducing downtime, maintaining responsiveness under high demand, proactively preventing performance degradation, and optimizing resource allocation across the enterprise's computing environment.

Figure 1:
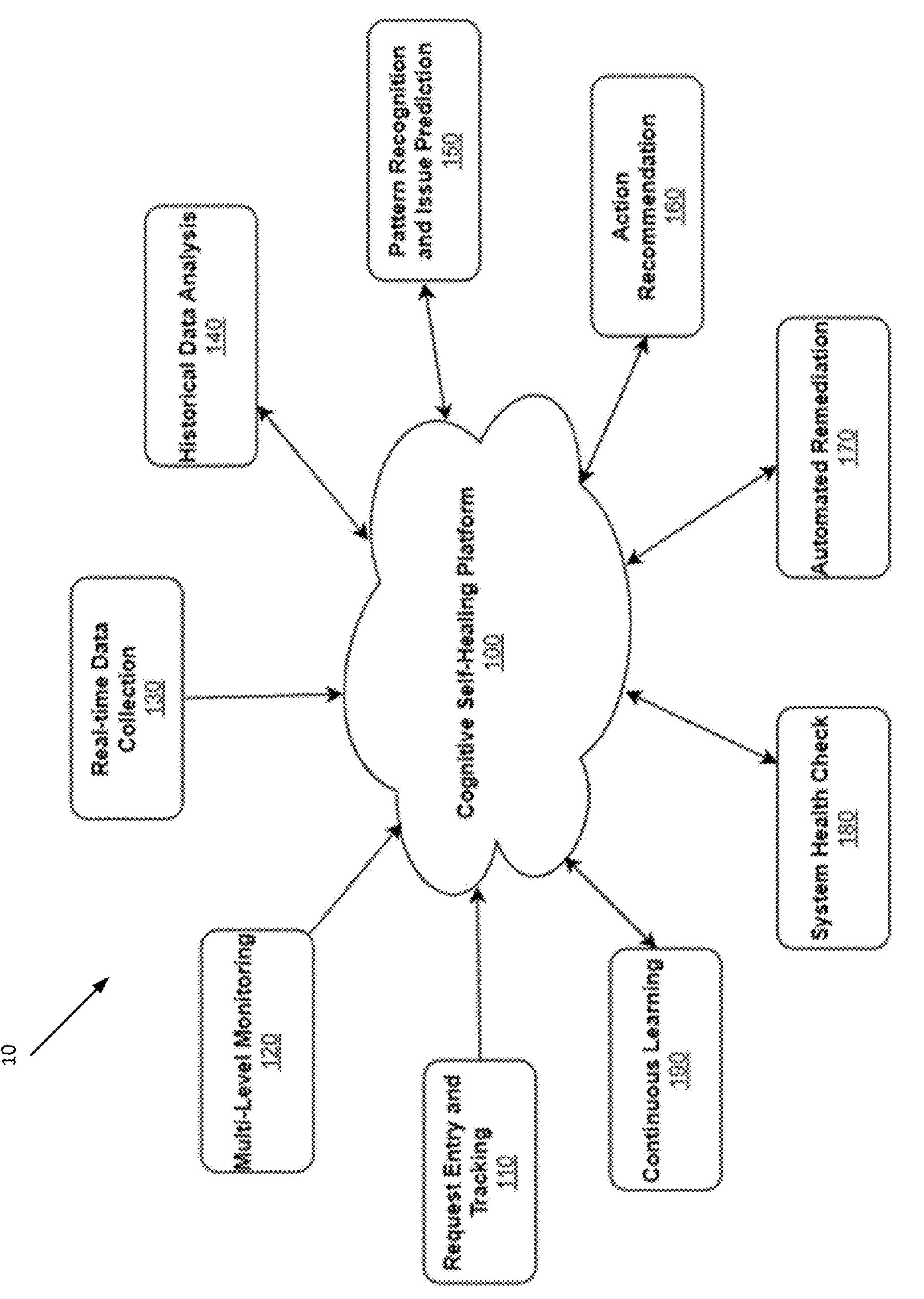
FIG. 1 illustrates core components of a cognitive self-healing platform and their interactions according to various embodiments of the preset invention.

An exemplary embodiment of a system 10 according to the present invention is shown in FIG. 1. In this embodiment, a cognitive self-healing platform 100 includes and coordinates multiple functional modules that work together to monitor, analyze, predict, and remediate issues in a distributed computing environment. In various embodiments, these functional modules comprise request entry and tracking 110, multi-level monitoring 120, real-time data collection 130, historical data analysis 140, pattern recognition and issue prediction 150, action recommendation 160, automated remediation 170, system health check 180, and continuous learning 190. While FIG. 1 illustrates one possible arrangement of components within the cognitive self-healing platform 100, other configurations and groupings of these modules may be employed without departing from the principles of the present invention.

The request entry and tracking module 110 can receive and register incoming requests within the computing environment. Requests may originate from a variety of sources, including user-initiated interactions with client-facing applications, automated background processes, other enterprise systems, or external partner systems communicating via application programming interfaces (APIs) or message queues. Each request may be assigned a unique identifier for end-to-end traceability as it traverses various components of the system. The tracking function captures contextual metadata, enabling correlation between requests and performance metrics. In some embodiments, the request entry and tracking function may be implemented as a microservice deployed in a container orchestration framework such as Kubernetes, with horizontal scaling to handle fluctuating request volumes. For high-throughput environments, request IDs may be generated using distributed ID-generation algorithms (e.g., Snowflake-style) to ensure uniqueness across multi-region deployments. Metadata storage may leverage low-latency, in-memory data grids (e.g., Redis, Hazelcast) for rapid correlation across monitoring and analytics layers. In some embodiments, this functionality may be implemented in software executing on one or more general-purpose servers, network appliances, or integrated into existing application gateways. In some embodiments, the system assigns a unique request identifier at the earliest ingress point, such as a network switch or API gateway. This identifier persists through every network hop, service invocation, and database query associated with the request, allowing the system to maintain a contiguous, end-to-end record of the request's journey.

In certain embodiments, the platform may implement "request DNA" tracking, in which each incoming user or system request is assigned a unique identifier at the network ingress point. This identifier may persist throughout the lifecycle of the request, enabling end-to-end visibility across all system layers, including network hops, application tiers, database queries, and microservice calls. The system may log performance and health metrics at each stage and associate them with the identifier, allowing for precise correlation of issues to specific components. Such request-level traceability can facilitate root cause analysis, inform predictive models with granular contextual data, and provide an auditable trail for compliance or forensic investigations. In some configurations, the request DNA may be extended to span hybrid environments, enabling unified visibility from on-premise systems to cloud-hosted components.

The multi-level monitoring module 120 can observe the performance and status of system components across multiple layers of the architecture, such as the network layer, infrastructure layer, and application layer. Monitoring may include metrics such as latency, throughput, error rates, and resource utilization. The monitoring functionality may be implemented by deploying agents or probes within the network, host systems, and application processes, with data transmitted to a central analytics service. Agents may use OS-native telemetry hooks, SNMP polling, and application performance monitoring (APM) SDKs to collect relevant metrics. In some embodiments, network-level telemetry may be integrated directly with software-defined networking (SDN) controllers for real-time topology updates, while infrastructure-level probes may exploit hypervisor APIs for virtualized workloads. Data transport between agents and the central analytics service may employ secure, high-throughput message buses such as Apache Kafka or cloud-native equivalents. The monitoring operations for these levels may be coordinated through a centralized orchestration layer that correlates telemetry in near real time. For example, a network latency spike observed between two switches may be correlated with a concurrent CPU utilization anomaly on an associated application server, allowing the system to determine causality rather than treating the anomalies as isolated events.

The real-time data collection module 130 can aggregate telemetry from the monitoring components and other sources in real time. Collected data may include system metrics, logs, events, and traces, and is formatted for analysis by subsequent modules. In various embodiments, the real-time collection function may be supported by message buses, streaming data platforms, or other high-throughput ingestion frameworks operating on commodity or cloud-based computing infrastructure.

The historical data analysis module 140 can access stored performance data and incident records to identify trends, baselines, and recurring issues. The analysis results are used to inform the detection and prediction functions of the platform. Historical data analysis may be performed using data warehouse systems, distributed file stores, or cloud-hosted analytics services.

The pattern recognition and issue prediction module 150 can apply analytical and machine learning techniques to identify patterns in real-time and historical data that may indicate emerging problems. Prediction models may generate forecasts of potential service degradation or failure. This functionality may be implemented using trained machine learning models executing on CPUs, GPUs, or specialized AI accelerators in server or cloud environments.

The action recommendation module 160 can determine possible corrective measures in response to detected anomalies or predicted issues. Recommendations may be prioritized based on severity, confidence, and operational policies. At a high level, this function may be implemented in software modules executing on servers or containerized services, optionally integrated with orchestration and automation tools.

The automated remediation module 170 can execute selected corrective actions without human intervention. Such actions can be directed to the enterprise's computing components, which may include servers, storage systems, network devices, virtual machines, containers, and application processes. Actions may include adjusting resource allocations, rerouting network traffic, restarting services, scaling infrastructure, terminating faulty processes, or modifying load balancer configurations. The remediation logic may be deployed as scripts, automation playbooks, or autonomous agents running on orchestration platforms or control nodes within the environment.

The system health check module 180 can perform validation checks to confirm that the system is operating within acceptable performance parameters. Health checks may be triggered periodically or after remediation actions, and may include synthetic transactions, resource utilization scans, and error log reviews. Health check functions may execute on dedicated monitoring servers or as part of distributed agent frameworks.

The continuous learning module 190 can update predictive models and decision-making logic based on the outcomes of prior actions. Feedback loops incorporate the results of successful and unsuccessful remediation attempts to refine future predictions and recommendations. Continuous learning functions may be hosted on machine learning platforms, using batch or online learning techniques to update models in place.

Figure 2:
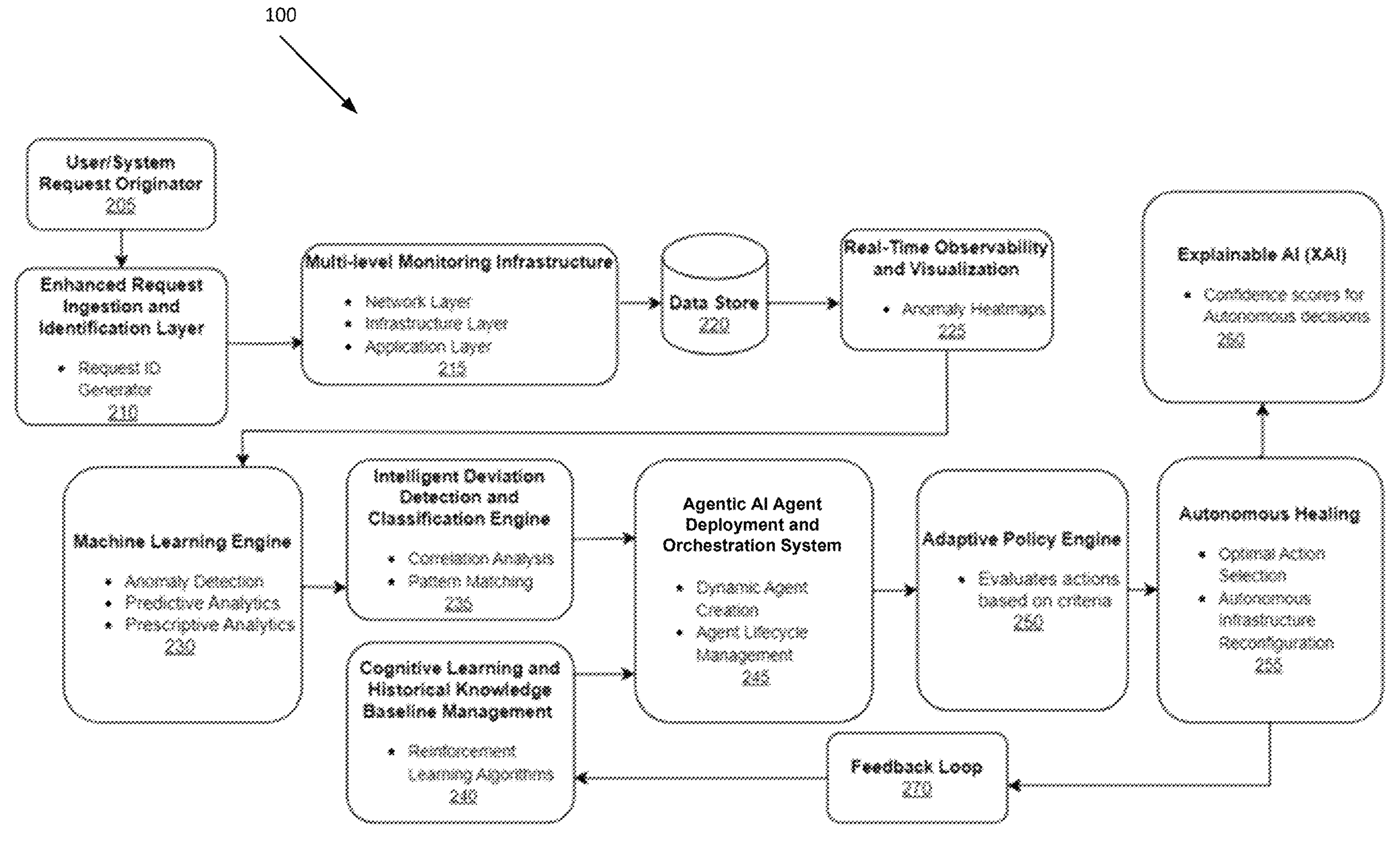
FIG. 2 illustrates the cognitive self-healing platform including major interconnected components and its primary data flow according to various embodiments of the present invention.

The cognitive self-healing platform 100 operates as an intelligent orchestration environment that ingests operational data from across the enterprise's computing systems, analyzes that data in real time and in historical context, predicts potential service degradations, and initiates or recommends corrective actions to maintain optimal performance and availability. FIG. 2 provides a more detailed architectural view of the cognitive self-healing platform 100, illustrating specific layers and services that individually or in combination implement or support the functional modules shown in FIG. 1.

A user/system request originator 205 represents a source of operational activity or service request within the enterprise computing environment. These may include client-facing applications such as transactional web portals, mobile applications, and interactive voice response (IVR) systems, as well as backend enterprise processes such as batch jobs, API calls from partner systems, or automated business workflows that trigger system events. Requests from these origins ultimately feed into the request entry and tracking module 110 of FIG. 1.

An enhanced request ingestion and identification layer 210 receives incoming requests from the request originator 205 and processes them through a request ID generator to assign a unique identifier. The identifier ensures end-to-end traceability of the request through downstream processing stages. This layer may also normalize request formats, extract metadata for classification, and route the request to appropriate processing queues. In various embodiments, the layer implements or supports the request entry and tracking module 110 of FIG. 1 by performing the registration and traceability functions described for that module.

A multi-level monitoring infrastructure 215 deploys monitoring agents, probes, and telemetry collectors at the network, infrastructure, and application layers of the enterprise architecture. Metrics collected can include latency, throughput, CPU and memory utilization, error rates, I/O wait times, and network packet loss. Data is streamed or batch-uploaded to the data store 220. This infrastructure corresponds to the multi-level monitoring module 120 of FIG. 1.

A data store 220 retains telemetry, logs, event records, configuration snapshots, and contextual metadata from the monitoring infrastructure 215 and other platform sources. In some embodiments, the data store is implemented as a dual-zone data lake, meaning it comprises two distinct but interoperable storage zones optimized for different usage profiles. A "hot" or real-time zone is optimized for rapid ingestion and low-latency access to recent telemetry and events, enabling immediate analysis by real-time processing components such as the machine learning engine 230 and the real-time observability and visualization component 225. A "warm" or "cold" historical zone stores large volumes of older, less frequently accessed data—such as archived telemetry, incident history, and long-term performance baselines—in cost-efficient storage. The platform can query and join data across these zones as needed, for example, by augmenting a current anomaly detection operation with relevant historical patterns from the cold zone. This component supports both the real-time data collection module 130 and the historical data analysis module 140 of FIG. 1. In one embodiment, the "hot" zone may be implemented on NVMe-backed storage clusters to enable sub-millisecond query latency for active analytics workloads, while the "warm" or "cold" zone may use erasure-coded object storage for cost-efficient long-term retention. Cross-zone queries may be accelerated by pre-computed indexes or materialized views stored in columnar formats (e.g., Parquet) for analytical efficiency.

A real-time observability and visualization component 225 processes telemetry and event data from the multi-level monitoring infrastructure 215, generating enriched data representations that serve as inputs to the machine learning engine 230 and other analytics components. Processing may include normalization, correlation, aggregation, and feature extraction to convert raw telemetry into machine-usable feature sets. While the component may also support human-facing visualization (e.g., anomaly heatmaps, topology overlays) for situational awareness, its primary role is to produce structured, real-time analytical data streams that enable rapid detection and prediction of service issues. This functionality extends the real-time data collection module 130 of FIG. 1 by transforming collected data into optimized inputs for predictive models. In some embodiments, the real-time observability component may maintain rolling time-window feature caches in memory to support sub-second anomaly scoring by downstream models. For visual analytics, the component may integrate with web-based dashboards capable of rendering topology maps, heatmaps, and time-series charts with real-time updates via WebSocket or gRPC streams.

A machine learning engine 230 applies advanced analytics such as anomaly detection, predictive analytics, and prescriptive analytics to the incoming data. Anomaly detection models may be trained, for example, using supervised learning techniques to distinguish normal operational baselines from deviations. Predictive analytics models can forecast future system states based on historical trends, while prescriptive analytics models can recommend optimal actions to mitigate anticipated issues. Training datasets may be drawn from the data store 220 and can include operational records such as incident and resolution data from IT service management platforms (e.g., ServiceNow tickets), enriched with contextual and outcome data from the feedback loop 270. In various embodiments, the engine hosts multiple models—such as neural networks, regression models, decision trees, clustering algorithms, and ensemble methods—each specialized for a different class of issue. This engine implements the analytical capabilities of the pattern recognition and issue prediction module 150 of FIG. 1. The real-time performance data can be continuously streamed into a feature extraction pipeline, which enriches the data with contextual information such as time-of-day patterns, seasonal workload variations, and recent configuration changes. This enriched dataset can then be evaluated by machine learning models that output both a probability score for a potential failure and a ranked list of recommended mitigation actions.

An intelligent deviation detection and classification engine 235 receives candidate anomalies or deviations identified by the machine learning engine 230 and performs deeper correlation analysis to determine whether they represent genuine operational issues. This analysis can include cross-metric correlation, temporal pattern alignment, and comparison against known incident signatures. Detected deviations are classified into operational categories—for example, network-related degradation, application-level failures, database bottlenecks, or security anomalies—which enables targeted remediation strategies. The classification results may be passed to the adaptive policy engine 250 for action selection and also recorded in the cognitive learning and historical knowledge baseline management component 240 for future model refinement. This functionality complements the pattern recognition and issue prediction module 150 of FIG. 1 by adding a semantic layer that bridges raw anomaly detection and actionable response.

A cognitive learning and historical knowledge baseline management component 240 maintains and continuously refines the operational baselines that represent expected system performance under varying conditions. These baselines may include statistical thresholds, learned performance envelopes, and model-generated norms for different subsystems and workloads. The component ingests classification outputs from the intelligent deviation detection and classification engine 235, along with contextual and outcome data from the feedback loop 270, to update its knowledge base. Updates may be performed using machine learning techniques such as reinforcement learning, online learning, or incremental retraining, allowing the baselines to evolve as the enterprise computing environment changes. The component may store multiple baseline sets for different operational modes (e.g., peak hours vs. maintenance windows) and use them to detect subtle degradations that deviate from historically "normal" patterns. In addition to supporting predictive accuracy, this component enables the platform to distinguish between true anomalies and benign fluctuations, reducing false positives. Functionally, it overlaps with both the historical data analysis module 140 and the continuous learning module 190 of FIG. 1, acting as the long-term memory and adaptive learning core of the cognitive self-healing platform.

Upon receiving a predicted issue and recommended actions, a decision module determines whether to: (i) execute the remediation automatically, (ii) execute partially while requesting human confirmation, or (iii) notify operators without execution. This decision may be based on policy rules that account for the predicted severity, affected systems, and compliance requirements.

An agentic AI agent deployment and orchestration system 245 manages the lifecycle of specialized AI agents used in prediction, decision-making, and remediation tasks. As used herein, an "agentic AI agent" is an autonomous, goal-directed software entity capable of perceiving inputs from the computing environment, reasoning over those inputs (e.g., by invoking machine learning models, rule-based logic, or hybrid approaches), and taking or recommending actions consistent with its assigned objective. Agents can be instantiated dynamically in response to specific events, anomalies, or workload conditions, and may operate independently or in coordination with other agents. They may be designed for short-term execution—terminating upon completion of a discrete task—or for long-lived operation, potentially entering a dormant state until reactivated by relevant triggers. Agent creation may involve selecting or generating a model or ruleset tailored to the task, provisioning necessary compute and data resources, and registering the agent with the orchestration system for monitoring and lifecycle control. The orchestration system may pre-warm execution environments—such as idle but resource-reserved containers—to achieve near-instantaneous (<100 ms) agent instantiation. Frequently used agent templates may be cached in high-speed local NVMe storage, and orchestration decisions may be distributed across a scheduler cluster to avoid single points of failure. These agents can perform specialized sub-tasks within the broader functions of the pattern recognition and issue prediction module 150, the action recommendation module 160, and the automated remediation module 170 of FIG. 1.

An adaptive policy engine 250 evaluates candidate remediation actions in light of enterprise-specific operational policies, learned effectiveness data, and real-time situational context. The engine receives proposed actions from upstream components such as the machine learning engine 230, the intelligent deviation detection and classification engine 235, and the agentic AI agent deployment and orchestration system 245. It then applies a multi-criteria decision-making process that may consider factors such as predicted remediation success rate, potential service impact, operational cost, risk level, and compliance with predefined rules or regulatory requirements. The adaptive nature of the engine allows it to modify its decision criteria over time, using reinforcement learning or policy-gradient methods to prioritize actions that have historically yielded positive outcomes while deprioritizing those with low efficacy or high collateral impact. Policies can be encoded as rule sets, decision trees, or learned policy networks, and may be dynamically updated based on feedback from the feedback loop 270. In some embodiments, the engine operates in different modes, such as an "autonomous" mode where the highest-ranked action is executed automatically by the autonomous healing component 255, and a "recommendation" mode where ranked options are presented for human review. This component corresponds to or supports the action recommendation module 160 of FIG. 1 by translating analytical insights into actionable, policy-compliant remediation plans. In some embodiments, the engine may maintain multi-dimensional optimization models balancing cost, compliance, and SLA objectives. These models may be continuously refined via reinforcement learning algorithms, which adjust weighting factors in real time based on the observed effectiveness of prior decisions.

An autonomous healing component 255 executes the selected remediation actions, implementing optimal action selection and infrastructure reconfiguration without requiring human intervention. Upon receiving an action plan from the adaptive policy engine 250, the component interfaces directly with the enterprise's computing infrastructure—including servers, virtual machines, containers, network devices, storage systems, and application services—to carry out corrective measures. These measures may include, for example, reallocating compute resources, dynamically scaling services up or down, rerouting network traffic, restarting or redeploying failed components, applying configuration changes, or invoking specialized automation scripts. Execution workflows can be orchestrated through integration with automation frameworks, orchestration platforms, or control plane APIs, ensuring that changes are propagated consistently across distributed systems. The component may operate transactionally, confirming each step through built-in verification routines and rolling back if an operation fails or introduces unintended side effects. It can also coordinate with the system health check module 180 of FIG. 1 (or its functional equivalent) to validate post-remediation service stability before returning the system to normal operation. The autonomous healing component 255 corresponds to the automated remediation module 170 of FIG. 1, serving as the final action layer in the cognitive self-healing platform's detection-decision-execution loop.

An explainable AI (XAI) component 260 generates human-interpretable explanations for autonomous or semi-autonomous decisions made by the cognitive self-healing platform 100, along with associated confidence scores. This component receives input from decision-making modules such as the adaptive policy engine 250 and the autonomous healing component 255, as well as analytical results from the machine learning engine 230 and intelligent deviation detection and classification engine 235. The explanations may describe, for example, which performance metrics or anomaly patterns triggered a particular remediation, how alternative actions were evaluated and ranked, and why the selected action was deemed optimal under the prevailing conditions. Confidence scores can be derived from probabilistic model outputs, ensemble agreement levels, or historical success rates for similar actions. In some embodiments, the XAI component uses model-agnostic interpretability techniques, such as SHAP (SHapley Additive explanations) values, LIME (Local Interpretable Model-agnostic Explanations), or rule extraction, to provide transparency regardless of the underlying model architecture. Explanations may be formatted for different audiences, with high-level rationales for operators and detailed technical reasoning for compliance auditors or incident review boards. By enabling traceability and auditability of decisions, the XAI component supports governance, regulatory compliance, and trust in the platform's autonomous operations. Functionally, this component may be used in conjunction with the action recommendation module 160 and the automated remediation module 170 of FIG. 1 to ensure that critical infrastructure changes are both justifiable and verifiable.

A feedback loop 270 captures the results of executed remediation actions, post-action system performance data, and operator input, and routes this information back to analytical and decision-making components such as the machine learning engine 230, the cognitive learning and historical knowledge baseline management component 240, and the adaptive policy engine 250. In various embodiments, the feedback may be processed in real time to update operational baselines or queued for batch retraining of predictive and prescriptive models. By continuously refining the platform's analytical and decision-making capabilities based on actual outcomes, the feedback loop 270 supports the continuous learning module 190 of FIG. 1 and enables the system to evolve its remediation strategies over time.

Figure 3:
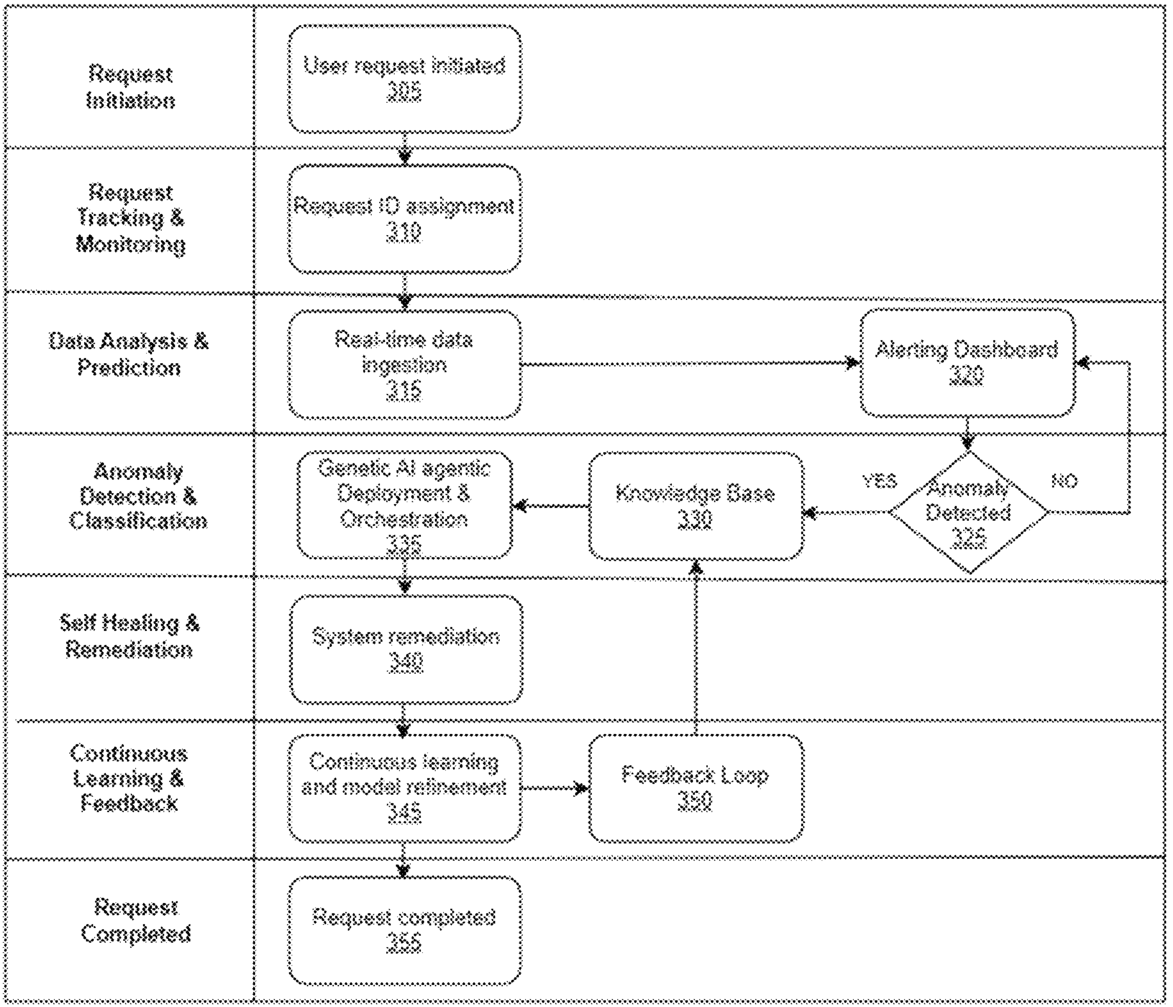
FIG. 3 is a flow chart of a process flow of a request through the cognitive self-healing platform according to various embodiments of the preset invention.

FIG. 3 illustrates an exemplary request lifecycle and self-healing workflow, showing how a request or operational event moves through the cognitive self-healing platform 100. The process includes request initiation, tracking and monitoring, data analysis and prediction, anomaly detection and classification, self-healing and remediation, continuous learning and feedback, and eventual request completion.

At step 305, a request is initiated by a user or system process within the enterprise computing environment. This request may originate from client-facing applications such as transactional web portals, mobile applications, or interactive voice systems, or from backend enterprise processes such as batch jobs, automated transactions, or system-generated workload demands. This step corresponds generally to the "User/System Request Originator" 205 in FIG. 2 and the originating input handled by the request entry and tracking module 110 in FIG. 1. At step 310, the request is assigned a unique identifier using a request ID generator within the enhanced request ingestion and identification layer 210 of FIG. 2. This identifier enables end-to-end traceability of the request as it traverses the distributed computing environment.

At step 315, real-time data ingestion occurs, in which operational telemetry, event logs, and contextual request data are collected from across the enterprise environment. This function may be performed by the multi-level monitoring infrastructure 215 and the real-time data collection module 130 in FIG. 1, with ingested data stored in the data store 220 for use in analysis. At step 320, the real-time observability and visualization component 225 may provide an alerting dashboard that surfaces key performance indicators and anomaly heatmaps, enabling rapid situational awareness.

At decision step 325, the platform evaluates the ingested data to determine whether an anomaly is present. This determination may be performed using the machine learning engine 230 and the intelligent deviation detection and classification engine 235 of FIG. 2, together implementing the pattern recognition and issue prediction module 150 of FIG. 1. Historical baselines and reinforcement-learning-driven thresholds may be accessed from the knowledge base 330, which corresponds to the cognitive learning and historical knowledge baseline management component 240 in FIG. 2. If an anomaly is detected, processing proceeds to step 335, where the genetic/agentic AI agent deployment and orchestration system 245 instantiates or activates specialized AI agents to address the anomaly. These agents may be dynamically generated, selected from a pool, or reconfigured based on the current operational context.

At step 340, the autonomous healing component 255 (FIG. 2) implements the selected corrective action, which may include resource reallocation, service restarts, traffic rerouting, or infrastructure scaling. In some embodiments, action selection is informed by the adaptive policy engine 250, which evaluates candidate remediations based on defined or learned criteria.

At step 345, the continuous learning and model refinement function, corresponding to continuous learning module 190 of FIG. 1 and supported by the feedback loop 270 of FIG. 2, incorporates the outcome of the remediation into the platform's models and baselines. Step 350 explicitly represents this feedback loop, in which post-remediation telemetry and outcome data are fed back into the machine learning engine 230 and cognitive learning component 240 to improve prediction accuracy and remediation effectiveness over time. As used herein, "outcome data" can refer to performance-related information collected during and after implementation of a remediation directive, including both updated telemetry data (e.g., CPU utilization, memory utilization, network throughput, and user experience metrics) and higher-level performance metrics (e.g., changes in throughput, latency, error rates, and resource utilization) that reflect the operational impact of the modification.

Finally, at step 355, the request is marked complete, indicating that the operational objective has been fulfilled, either through normal processing or via the intervention of the self-healing process.

Examples of how the process of FIG. 3 may operate are now provided in the context of proactive CPU allocation in anticipation of high traffic and reactive remediation in response to live conditions. In one illustrative scenario, the cognitive self-healing platform 100 manages an enterprise's e-commerce environment, which hosts client-facing web portals and mobile applications. During operation, the machine learning engine 230 and cognitive learning component 240 maintain a historical knowledge base 330 that includes seasonal and event-driven traffic patterns.

In a proactive mode (prediction-driven) example, assume that in early December, the machine learning engine 230 forecasts a 70% probability of a traffic surge at 9:00 a.m. the following day, based on historical patterns from prior holiday promotions. This prediction triggers the request lifecycle process shown in FIG. 3. The forecast is treated as an internally generated "request" (step 305), which is assigned a request ID in the enhanced request ingestion and identification layer 210 (step 310). Real-time data ingestion 315 confirms current resource utilization, and the anomaly detection decision point 325 marks the predicted surge as an actionable "predicted anomaly." The agentic AI agent deployment and orchestration system 245 instantiates short-term agents to increase CPU allocations on critical application servers. These actions are carried out via the autonomous healing component 255 (step 340) before the surge occurs, ensuring uninterrupted service.

In a reactive mode (metric-driven) example, assume that later that month, a flash sale unexpectedly drives a live spike in web traffic beyond normal operating baselines. Real-time data ingestion 315 detects elevated latency and error rates from the multi-level monitoring infrastructure 215, triggering the anomaly detection decision point 325 based on actual metrics. The agentic AI agent deployment and orchestration system 245 instantiates remediation agents—selected based on the anomaly classification results—to execute CPU scaling and network traffic rerouting via the autonomous healing component 255.

In both modes, the same process flow applies: once the actions are complete, the continuous learning and model refinement step 345 incorporates the outcome data into the feedback loop 270. If the proactive allocation overshot the actual need, future predictions will adjust recommended scaling factors; if reactive remediation occurred too late to prevent minor service delays, the models may lower the activation threshold for similar patterns.

Figure 4:
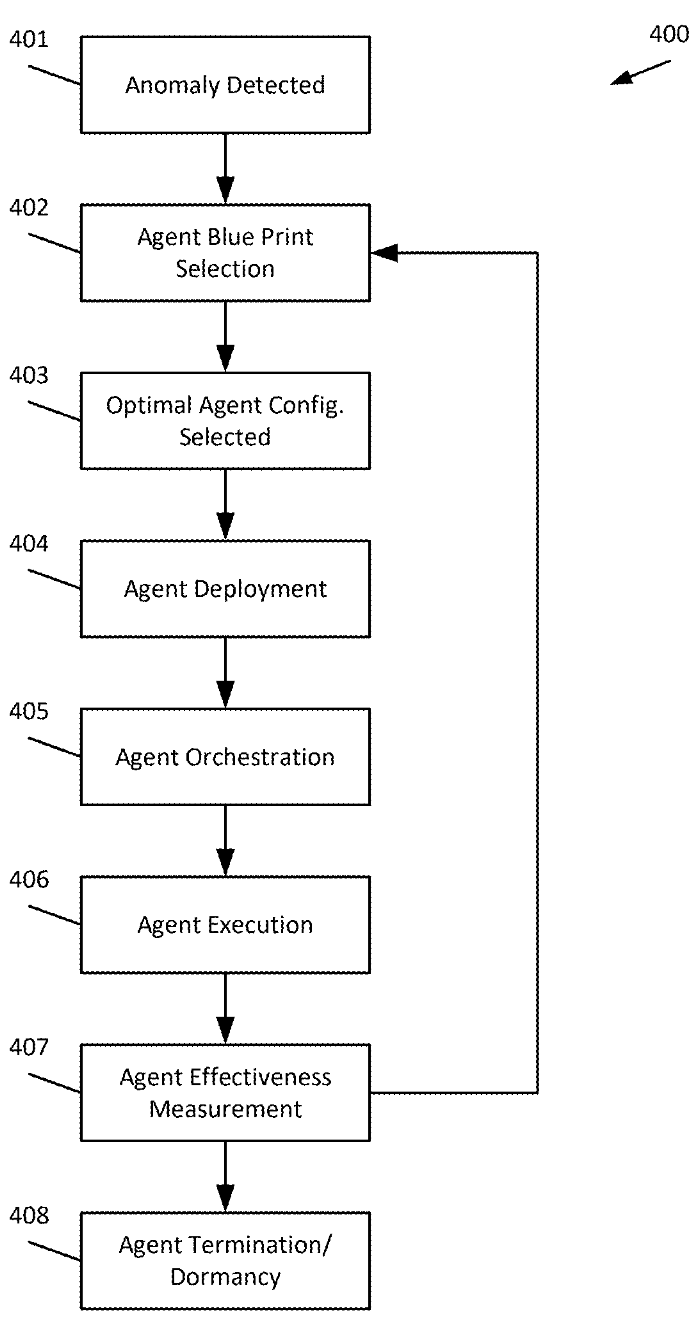
FIG. 4 illustrates a lifecycle of an agentic AI agent of he cognitive self-healing platform according to various embodiments of the present invention.

FIG. 4 illustrates an exemplary lifecycle 400 of an agent within the agentic AI agent deployment and orchestration system 245 of FIG. 2. The lifecycle shown essentially depicts the flow for a single agent from creation through task execution to termination or dormancy. In practice, the system 245 can manage multiple agents concurrently, and a single detected anomaly can trigger the instantiation of multiple agents, each configured with a specialized role to address different facets of the same issue. For example, if a high-severity service degradation is predicted, one agent may handle CPU scaling, another may reroute network traffic, and a third may perform targeted application restarts. The agentic AI agent deployment system 245 can generate these agents concurrently to minimize total resolution time, although serial instantiation is possible in embodiments where dependencies exist between agent actions.

In step 405, the lifecycle begins when an anomaly detection signal is received from the intelligent deviation detection and classification engine 235 or the machine learning engine 230 of FIG. 2 (corresponding to the pattern recognition and issue prediction module 150 of FIG. 1). The signal identifies the anomaly type, affected components, and relevant context from the data store 220 and monitoring infrastructure 215.

In step 410, the agent blueprint selection process occurs within the agentic AI agent deployment and orchestration system 245. The system retrieves a pre-defined blueprint from an agent blueprint repository that describes the core logic, operational parameters, and communication interfaces for the agent. These blueprints may be stored as container images, lightweight virtual machine templates, or microservice packages ready for instantiation.

In step 415, the blueprint is customized based on the anomaly context. The adaptive policy engine 250 and cognitive learning component 240 can inject configuration parameters-such as target system identifiers, remediation thresholds, or time constraints-so that the agent's execution logic is tailored to the present incident. This step ensures that the same general-purpose blueprint can be specialized for a wide range of anomaly types.

Step 420 depicts agent instantiation and deployment. The agentic AI agent deployment system 245 uses a low-latency orchestration framework—such as Kubernetes with pre-warmed nodes, serverless function orchestration, or FPGA/

ASIC-based acceleration—to spin up the agent in its designated execution environment. In a cloud environment, this may involve launching a container in a pre-allocated compute pool; in on-premises systems, it may involve initiating a process within an already-running agent runtime.

In step 425, the agent executes its assigned remediation task. This may involve interacting directly with the autonomous healing component 255 (corresponding to the automated remediation module 170 in FIG. 1) to reconfigure infrastructure, scale resources, restart processes, or take other corrective actions. The agent can coordinate with other concurrently running agents through a shared message bus or coordination layer within system 245 to avoid conflicting changes.

In step 430, the agent reports its actions and observed outcomes to the explainable AI component 260 for logging, confidence scoring, and auditability. This data is also fed into the feedback loop 270, where it is stored in the data store 220 and incorporated into model refinement by the machine learning engine 230 and cognitive learning component 240.

Finally, in step 435, the agent either terminates or enters a dormant state. Termination occurs when the agent is no longer needed, freeing system resources. In some embodiments, particularly when recurring anomalies are likely, agents can persist in a dormant state-retaining their specialized configuration but consuming minimal resources-so that they can be reactivated almost instantly in the future.

In certain embodiments, the cognitive self-healing platform 100 can complete the end-to-end process from anomaly detection to active agent execution in approximately 100 milliseconds or less. This performance is achieved through a combination of architectural and implementation optimizations. The orchestration layer within the agentic AI agent deployment and orchestration system 245 maintains a pool of pre-warmed execution environments—such as idle but resource-bound containers or microservices—that can be assigned an agent role immediately upon blueprint selection. Agents are designed to be lightweight, often leveraging event-driven serverless architectures, so that initialization overhead is negligible. In some embodiments, hardware acceleration is used; for example, FPGAs or custom ASICs execute the template loading, configuration injection, and deployment steps directly in hardware, bypassing slower software orchestration paths.

The system also supports concurrent initialization pipelines, enabling multiple agents triggered by the same anomaly to be launched in parallel across distributed compute nodes while remaining coordinated through the deployment scheduler. To further minimize latency, frequently used agent blueprints are cached in high-speed memory or local NVMe storage on the orchestration controller, avoiding the need to retrieve them from remote repositories during deployment. By integrating these strategies, the platform can instantiate and deploy one or more specialized agents in near real time, enabling rapid and coordinated remediation actions for both predicted and live anomalies.

Figure 5:
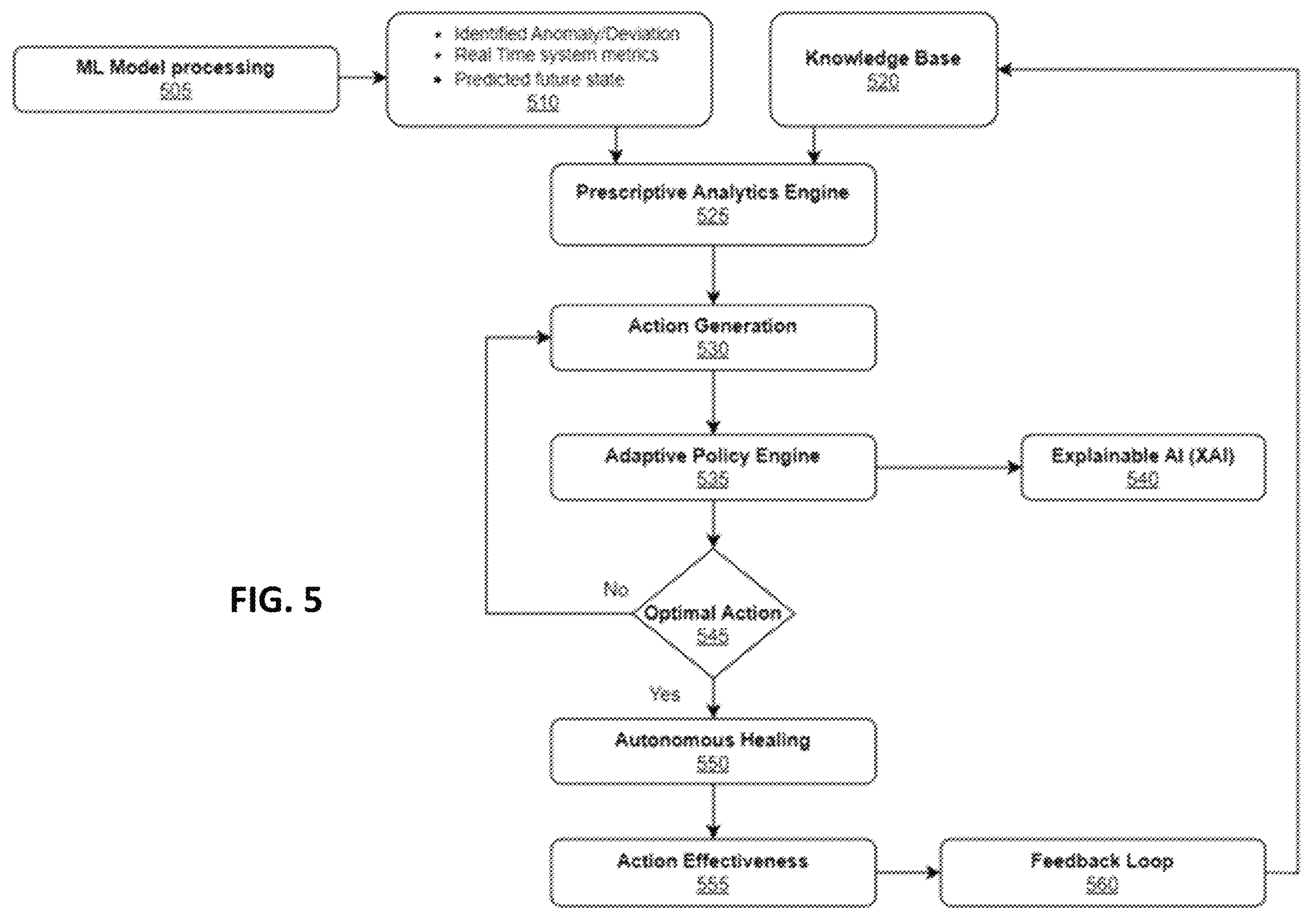
FIG. 5 illustrates a prescriptive action engine workflow according to various embodiments of the present invention.

FIG. 5 illustrates, at a process level, the prescriptive action engine workflow—the end-to-end decision-making sequence by which the cognitive self-healing platform 100 transforms machine learning outputs and historical knowledge into ranked, policy-compliant, explainable, and autonomously executed corrective actions—according to various embodiments of the present invention. The figure shows how inputs from the platform's analytic subsystems are combined, evaluated, and translated into optimal actions, and how the results of those actions are fed back for continuous improvement.

At the left, the ML model processing block 505 represents the outputs of the machine learning engine 230, the intelligent deviation detection and classification component 235, and the cognitive learning and historical knowledge baseline management component 240 of FIG. 2. These outputs feed into the input aggregation stage 510, which can combine three categories of data (i) identified anomalies or deviations from established baselines (as detected by component 235), (ii) current real-time operational metrics collected by the multi-level monitoring infrastructure 215, and (iii) predicted future states such as anticipated surges or degradations (as forecast by the machine learning engine 230). By aggregating these heterogeneous inputs into a unified data package, stage 510 provides a comprehensive situational context for downstream decision-making.

In parallel, a knowledge base 520, which can correspond to the historical repository maintained by cognitive learning 240 and supporting historical data analysis 140 in FIG. 1, can provide contextual patterns, prior resolutions, and curated remediation playbooks.

The aggregated inputs from 510 and the contextual knowledge from 520 converge in the prescriptive analytics engine 525, which corresponds functionally to the action recommendation module 160 of FIG. 1 and is partially implemented within the adaptive policy engine 250 of FIG. 2. The prescriptive analytics engine synthesizes the available insights to identify potential courses of action that could resolve the detected or predicted issue.

Action generation step 530, which can be executed within the adaptive policy engine 250, can produce a set of candidate actions. Each candidate can be evaluated against the platform's policy constraints, service-level objectives, and optimization goals in the adaptive policy engine 535. The adaptive policy engine also interacts with the explainable AI component 260 (Explainable AI 540 in FIG. 5) to generate human- or audit-readable justifications for candidate actions, which can be surfaced to administrators, logged for compliance, or used to improve transparency in automated decision-making.

If the evaluation at the optimal action decision point 545 determines that none of the current candidates meet the defined optimization criteria, the workflow can iterate, refining the candidate set using updated metrics or policy relaxations. Once an optimal action is selected, the process transitions to an autonomous healing step 550, corresponding, for example, to the autonomous healing component 255 of FIG. 2 and automated remediation module 170 of FIG. 1. This stage can be responsible for executing the chosen action directly against the affected resources, which may involve scaling compute capacity, rerouting network traffic, restarting services, or invoking specialized agentic AI agents via the agent deployment and orchestration system 245.

Following execution, an action effectiveness step 555 measures whether the action achieved the intended outcome, leveraging telemetry from the multi-level monitoring infrastructure 215. The measured outcomes are then passed to the feedback loop 560, which updates the cognitive learning component 240 and retrains or adjusts the machine learning engine 230 and adaptive policy engine 250 as needed. This closed-loop feedback mechanism ensures that future recommendations are better aligned with real-world results, improving both the precision and timeliness of the platform's responses. In this way, FIG. 5 depicts the orchestration of detection, decision-making, explainable justification, autonomous execution, and learning-integrating components from FIGS. 1 and 2 into a unified prescriptive action workflow that operates in real time or near-real time to maintain optimal service performance.

Figure 6:
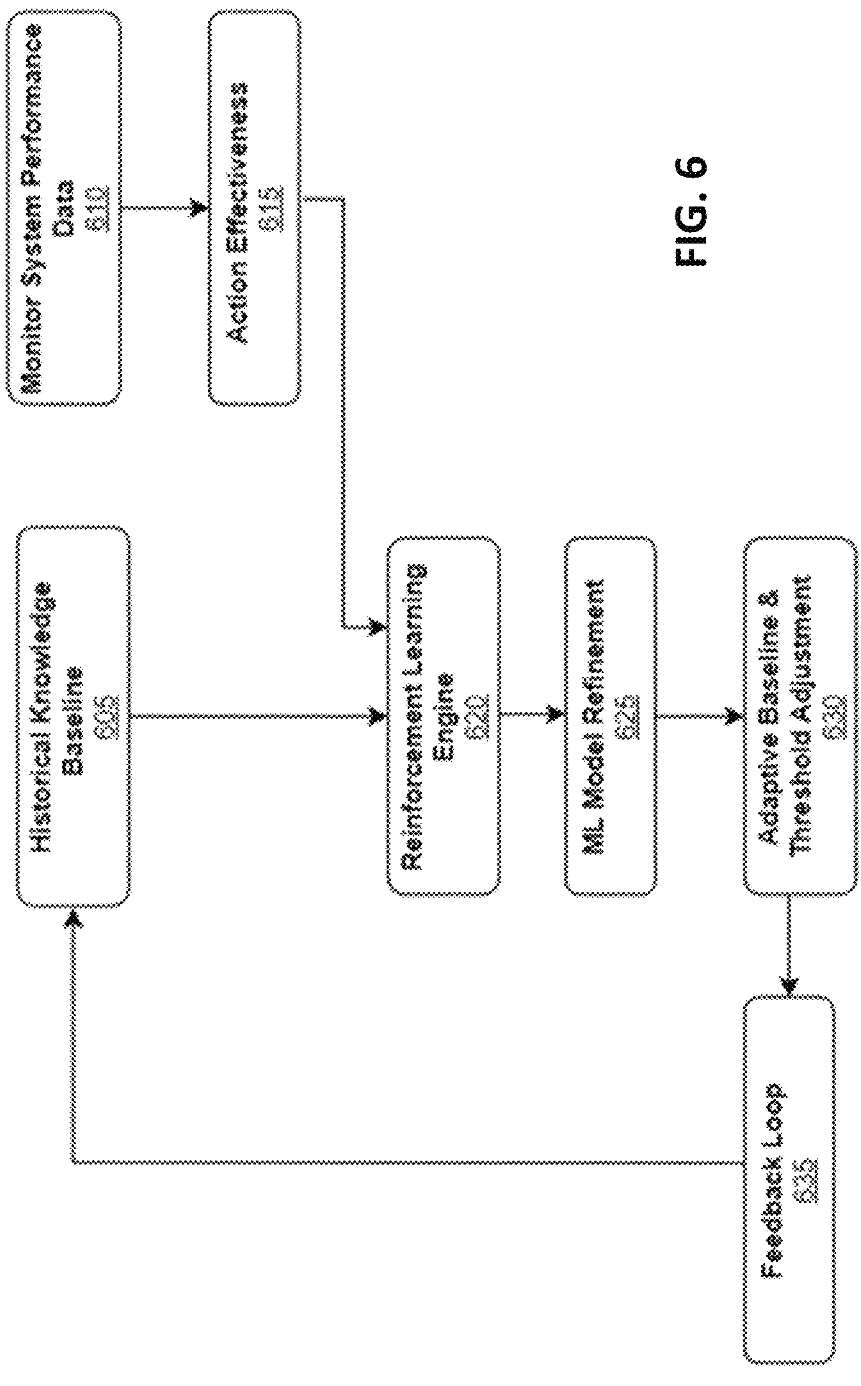
FIG. 6 illustrates a continuous learning aspect of the cognitive self-healing platform according to various embodiments of the present invention.

FIG. 6 illustrates a continuous learning and historical knowledge baseline management cycle of the cognitive self-healing platform 100 according to various embodiments of the present invention. The illustrated process refines the system's understanding of normal operational behavior and dynamically adjusts baselines and thresholds to improve anomaly detection accuracy and prescriptive action effectiveness over time.

The process begins with the historical knowledge baseline 605, which can correspond to the historical knowledge store maintained by the cognitive learning and historical knowledge baseline management component 240 of FIG. 2 and the knowledge baseline management module 160 of FIG. 1. This baseline contains representations of expected system behaviors, performance norms, and thresholds for deviation. In parallel, the multi-level monitoring infrastructure 215 (FIG. 2) can continuously gather system performance data at step 610, such as CPU utilization, network latency, transaction error rates, and other relevant telemetry. This data is evaluated for action effectiveness at step 615 by comparing post-remediation or post-optimization performance to pre-action baselines. Step 615 may be performed, for example, by the multi-level monitoring infrastructure 215 in FIG. 2, working together with the cognitive learning and historical knowledge baseline management component 240.

A reinforcement learning engine implemented for example, within the cognitive learning and baseline management component 240, can integrate, at step 620, this effectiveness data with the historical knowledge baseline. Using reinforcement learning techniques, it assigns rewards or penalties to past actions and updates its decision-making policies accordingly.

Updated decision-making policies can be applied to the machine learning engine 230 (FIG. 2) during a ML model refinement step 625. This step may involve retraining anomaly detection, predictive analytics, or prescriptive analytics models using the enriched dataset now augmented with action-effectiveness outcomes. The refined models can inform adaptive baseline and threshold adjustment at step 630, in which the system recalibrates what constitutes "normal" performance for given operational contexts. This ensures that seasonal trends, workload changes, or infrastructure upgrades are reflected in the system's active thresholds and do not lead to false positives or missed anomalies. Finally, the updated baselines and models can be propagated through the feedback loop 635 (corresponding to feedback loop 270 in FIG. 2 and FIG. 3) so that future anomaly detection, agent deployment, and prescriptive action workflows operate with improved accuracy and contextual awareness.

Through this closed-loop process, the system continually adapts to changing conditions. For example, if a high-traffic pattern during a new product launch is identified and successfully mitigated, that pattern and the effectiveness of the mitigation are incorporated into the historical baseline so that future similar events can be anticipated and addressed more efficiently.

Figure 7:
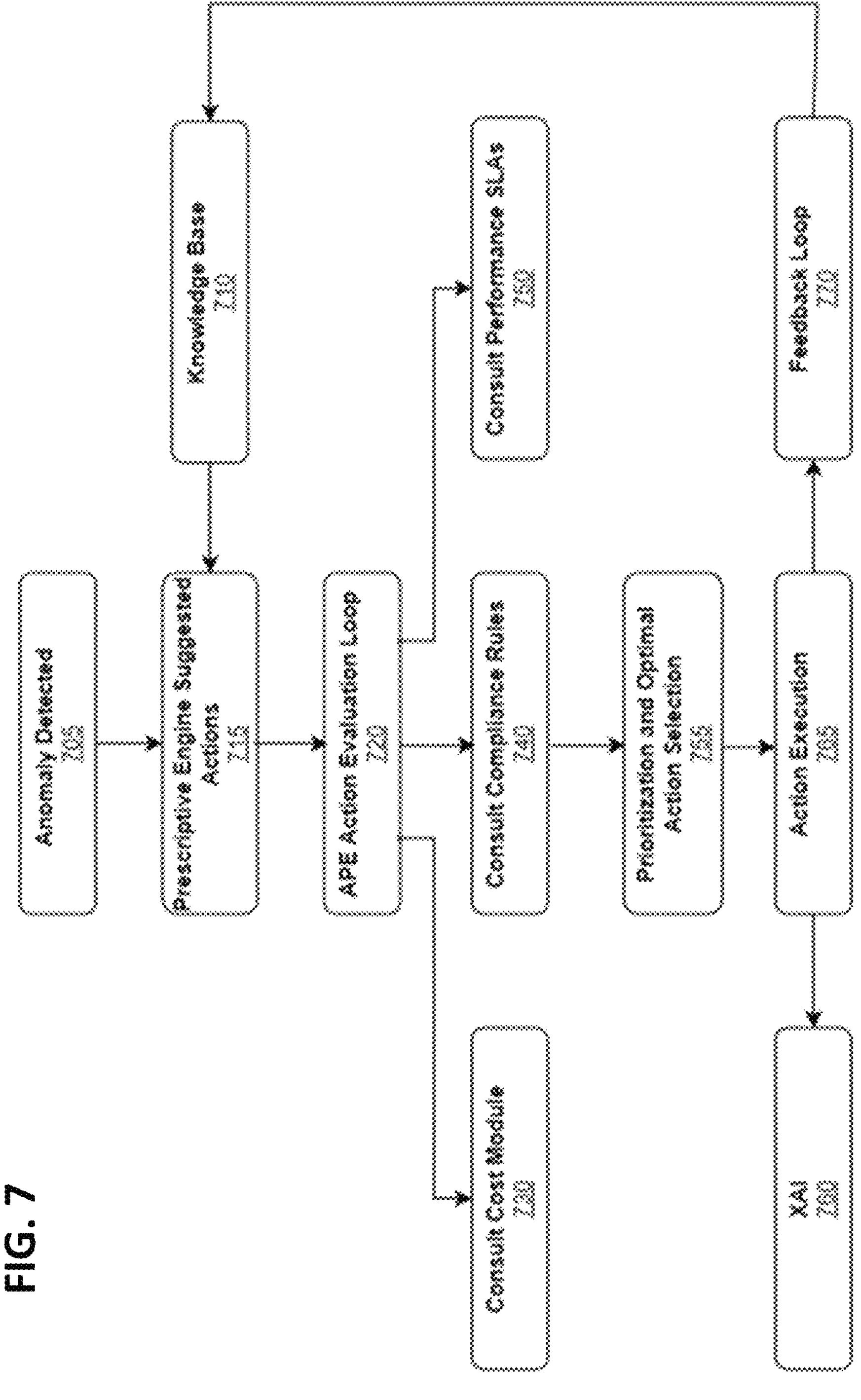
FIG. 7 illustrates, according to various embodiments of the present invention, a decision flow for an adaptive policy engine, including how it evaluates potential remediation actions based on real-time cost, compliance, and performance policies.

FIG. 7 illustrates, according to various embodiments, a decision-making workflow of the adaptive policy engine (APE) 250 within the broader autonomous remediation architecture, showing how the APE evaluates and selects optimal remediation or optimization actions in response to detected anomalies by integrating real-time monitoring data, historical knowledge, cost and compliance constraints, and performance objectives before executing the chosen action and feeding the results back into the system's continuous learning loop. The illustrated process can start at step 705, where anomaly detection is performed by the intelligent deviation detection and classification component 235 in conjunction with the multi-level monitoring infrastructure 215. These components continuously monitor operational telemetry and detect deviations from established baselines or expected patterns, which may be generated or updated by the machine learning engine 230.

The knowledge base of step 710 corresponds to the historical repository maintained by the cognitive learning and historical knowledge baseline management component 240 and the historical data analysis component 140. It stores contextual patterns, prior resolutions, cost models, compliance guidelines, and performance benchmarks, and may be accessed dynamically during subsequent steps to inform decision-making.

At step 715, the prescriptive analytics engine 525, which overlaps functionally with the action recommendation module 160 and may operate within the adaptive policy engine 250, can generate a set of candidate remediation or optimization actions in response to the detected anomaly. These suggested actions are informed by the knowledge base of step 710 as well as real-time system state data.

At step 720, the adaptive policy engine 250 can initiate its action evaluation loop, iteratively assessing each candidate action against multiple policy domains, including cost, compliance, and performance. This iterative loop enables the system to dynamically refine or re-rank the candidate actions based on the evaluation results.

The cost module consulted at step 730 may be implemented as part of the adaptive policy engine 250 or as an associated sub-module. It can reference cost models and budget constraints, potentially retrieved from the knowledge base, to quantify the economic impact of each proposed action.

At step 740, the adaptive policy engine 250 can evaluate each candidate action against compliance rules and applicable regulatory requirements. The compliance rules may be curated and periodically updated in the knowledge base.

At step 750, the adaptive policy engine 250 or an associated SLA evaluation module can evaluate each action against performance-related service-level agreements. This ensures that any selected remediation will maintain or improve performance thresholds.

At step 755, the adaptive policy engine 250 can consolidate the evaluations from steps 730, 740, and 750 to prioritize the candidate actions and select an optimal action for execution.

The explainable AI stage at step 760 can be performed by the explainable AI component 260, which can generate human- and audit-readable explanations for the selected action. These explanations can be stored in the knowledge base, displayed to operators, or archived for compliance documentation.

At step 765, the selected action can be executed by the autonomous healing component 255 and/or the automated remediation module 170, and may include the invocation of agentic AI agents via the agent deployment and orchestration system 245.

Finally, the feedback loop at step 770 feeds post-execution results into the cognitive learning and historical knowledge baseline management component 240 and the machine learning engine 230. This enables refinement of the models, updating of baselines, and improvement in the quality of future recommendations.

Figure 8:
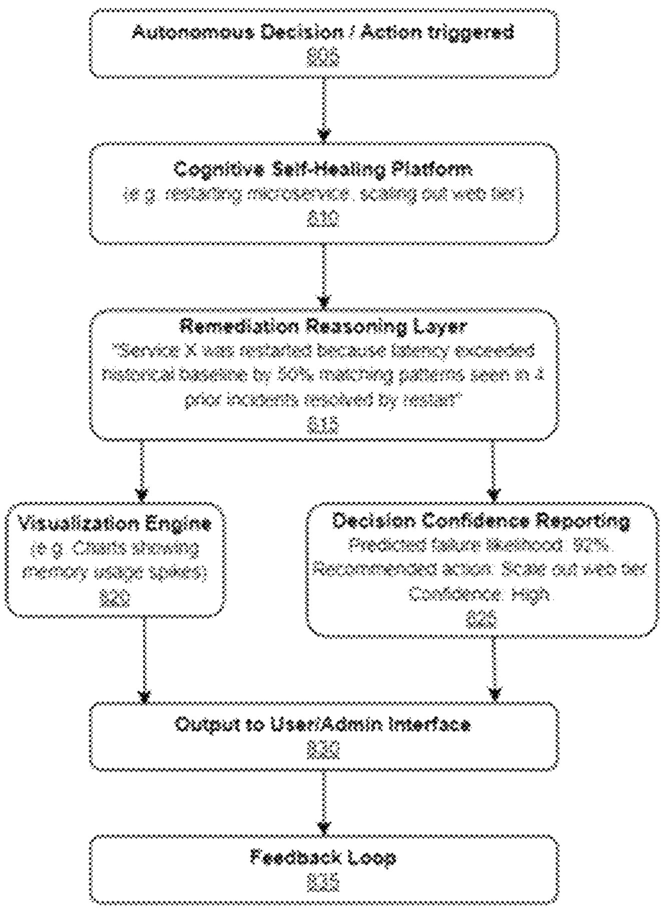
FIG. 8 illustrates, according to various embodiments of the present invention, a workflow for an explainable AI module, including how it can generate human-readable justifications and confidence scores for the autonomous decisions made by the cognitive self-healing platform.

In one embodiment, FIG. 8 illustrates a workflow carried out primarily by the Explainable AI (XAI) module 250 of FIG. 2, working in coordination with the cognitive self-healing platform 100 of FIG. 1. The process begins at step 805, where the XAI module 250 receives a trigger that an autonomous decision or action has been initiated—such as a prescriptive remediation instruction generated by the adaptive policy engine 245. At step 810, the XAI module 250 interfaces with the cognitive self-healing platform 100 to carry out the prescribed action, such as restarting a microservice or scaling out a web tier.

Once the action is underway, the XAI module 250 can employ an internal remediation reasoning layer at step 815 to generate a human-readable explanation for why the action was taken, drawing on historical performance data, anomaly context, and previously observed remediation patterns. At step 820, a visualization engine within the XAI module 250 can generates graphical outputs—such as charts of performance metrics—that visually support the remediation reasoning. In parallel, a decision confidence reporting component of the XAI module 250 at step 825 can calculates and reports confidence metrics for the action, including predicted failure likelihood, recommended actions, and an associated confidence rating.

At step 830, the XAI module 250 outputs this combined reasoning, visualization, and confidence information to the user/admin interface for operator awareness and review. Finally, at step 835, a feedback loop conveys operator inputs and observed post-action outcomes back into the XAI module 250 and, where applicable, to the cognitive self-healing platform 100 and the broader system knowledge base, enabling continuous learning and improved transparency of autonomous decision-making.

Referring back to FIGS. 1 and 2, the cognitive self-healing platform 100 may be realized as a combination of hardware and software components deployed in one or more data centers, cloud environments, or hybrid infrastructures. The platform may include one or more server-class computing systems—such as rack-mounted x86 or ARM-based processors with multi-core CPUs, large memory configurations, and high-speed storage—that host virtual machines, containers, or other execution environments in which the described modules operate. These servers may be connected via high-bandwidth, low-latency networking hardware such as top-of-rack switches, leaf-spine fabrics, and edge routers to ensure rapid data movement between components and layers. The Request Entry and Tracking component may be implemented as a software service or microservice running on such infrastructure, configured to intercept incoming network traffic and assign a globally unique request identifier (e.g., a UUID or structured Request ID) to each transaction. This identifier may be stored in a high-performance, distributed database or message queue for correlation across monitoring layers.

The multi-level monitoring component may include software agents or probes deployed at the network, infrastructure, and application layers. At the network layer, packet capture utilities, switch telemetry features, or software-defined networking (SDN) controllers may provide latency, jitter, and packet loss metrics. At the infrastructure layer, operating system instrumentation, hypervisor APIs, or vendor-specific monitoring frameworks may collect CPU, memory, disk I/O, and GPU utilization statistics. At the application layer, application performance monitoring (APM) tools, log aggregation services, and synthetic transaction scripts may measure API latency, error rates, and throughput. Collected data may be transmitted in real time over message buses such as Apache Kafka or cloud-native equivalents to a centralized Data Store, which may be implemented using scalable time-series databases or cloud object storage optimized for analytics.

The real-time data collection module may be embodied as a streaming data pipeline that ingests telemetry from all monitoring agents, normalizes data formats, and tags records with the associated Request IDs. This pipeline may leverage distributed processing frameworks, such as Apache Flink or Spark Streaming, to perform near-real-time computations and persist results for analysis. Historical Data Analysis may be performed by analytic workloads running on big data platforms or cloud-native analytics engines, comparing incoming metrics against historical baselines stored in the Data Store. These baselines may be adaptive, generated using context-aware algorithms that account for time-of-day, day-of-week, or seasonal patterns, avoiding static thresholds and reducing false alarms.

Pattern recognition and issue prediction may be implemented with machine learning models trained on labeled historical incident data. These models—such as gradient-boosted trees, recurrent neural networks, or transformer-based anomaly detectors—may operate on both real-time and batch data to identify correlations and trends that precede system degradations or failures. The models may be deployed via a Machine Learning Engine running on CPU or GPU hardware, potentially using frameworks such as TensorFlow, PyTorch, or Scikit-learn, and may output predictions to downstream modules.

The action recommendation component may be realized as an adaptive policy engine that encodes expert-derived rules, prescriptive analytics, and learned intervention strategies. This engine may consult a knowledge base populated with remediation steps from prior incidents, associating root causes with successful corrective actions. In some cases, the Adaptive Policy Engine may run simulations or cost-benefit analyses before recommending a fix, weighting factors such as expected downtime reduction and resource consumption.

Automated remediation may be executed by an agentic AI agent deployment and orchestration system. This subsystem may use orchestration frameworks such as Kubernetes, cloud automation tools, or infrastructure-as-code platforms to instantiate autonomous software agents capable of carrying out the recommended actions. These agents may perform operations such as restarting failed services, reallocating compute or storage resources, rerouting network traffic, or rolling back faulty deployments. Actions may be triggered automatically when confidence scores—generated by an Explainable AI module—exceed a defined threshold, or may require human approval for complex or high-impact interventions.

System health check modules may verify the operational status of infrastructure and services following remediation, using the same multi-level monitoring data sources to confirm that key performance indicators have returned to normal ranges. Continuous Learning may be implemented via a feedback loop that records each incident, prediction, action, and outcome in the knowledge base. Machine learning models may be periodically retrained on this augmented dataset to improve future prediction and remediation accuracy.

From a deployment perspective, the cognitive self-healing platform may be distributed across multiple geographic regions to provide global scalability, with load balancers directing requests to the nearest healthy instance. High-availability configurations—such as active-active clusters, redundant network paths, and failover mechanisms—may be employed to ensure consistent performance even during component outages. Security measures, including authentication, encryption in transit and at rest, and role-based access control, may be integrated throughout the platform to protect sensitive operational and user data.

In various embodiments, portions of the described functionality may be implemented in dedicated hardware—such as network appliances for deep packet inspection, FPGA-based accelerators for real-time analytics, or AI inference chips for low-latency predictions—while other portions may be implemented entirely in software running on commodity servers. This modular design allows the system to adapt to evolving infrastructure, cloud environments, and performance requirements while maintaining its core capabilities of end-to-end monitoring, predictive analytics, automated remediation, and continuous improvement.

In some embodiments, the cognitive self-healing platform may provide measurable operational and architectural improvements over conventional monitoring and remediation systems. For example, the platform can reduce unplanned downtime by predicting and resolving issues preemptively, in certain implementations improving uptime from "four nines" (99.99%) to "six nines" (99.9999%). It may further optimize resource utilization by preventing over-provisioning through precise scaling decisions, such as adding cloud instances only when forecast models predict demand. The architecture can be designed for distributed, hybrid, and multi-cloud environments, supporting seamless scaling and policy enforcement across different deployment types. Cost savings may be realized by automatically terminating underutilized resources, such as scaling down during off-peak hours. These architectural capabilities allow the platform to act as a unified resiliency layer across heterogeneous systems.

In various embodiments, any of the engines, modules, subsystems, or frameworks described herein may be implemented on one or more computing nodes of a distributed computing environment. A computing node may comprise tangible hardware resources including at least one processor, memory storing executable instructions, and one or more network interfaces. The processor(s) may be general-purpose central processing units (CPUs), graphics processing units (GPUs), application-specific integrated circuits (ASICs), field-programmable gate arrays (FPGAs), or any combination thereof, configured to execute the stored instructions to perform the operations attributed to the respective engine, module, subsystem, or framework. The memory may include volatile memory (e.g., RAM) and/or non-volatile memory (e.g., flash storage, magnetic disks) for storing the executable instructions and any data used or generated during execution.

In some embodiments, a computing node may be embodied as a physical server in a data center, a virtual machine provisioned in a cloud computing environment, a containerized instance running within an orchestration platform, or another processing unit capable of executing program instructions and communicating over a network. The engines, modules, subsystems, or frameworks described herein may be implemented entirely on a single computing node or distributed across multiple computing nodes that cooperate via one or more networks. Such networks may include local area networks (LANs), wide area networks (WANs), the Internet, or combinations thereof, using wired or wireless communication technologies.

It should be understood that references to "engines," "modules," "frameworks," and similar terms are intended to describe functional groupings of program instructions and associated resources, and are not limited to any particular implementation. Unless otherwise specified, such components may be realized through software executing on general-purpose hardware, through dedicated hardware logic, or through combinations thereof.

As used herein, the term "computing environment configuration state" refers to a set of technical attributes of a distributed computing environment that collectively determine its operational behavior. The computing environment configuration state may include, without limitation, operational parameters of one or more computing nodes (e.g., CPU frequency, process scheduling policies), hardware resource allocations (e.g., memory partitions, storage assignments), software service settings (e.g., service endpoints, authentication configurations), and network path parameters (e.g., routing tables, bandwidth allocations, quality-of-service priorities).

In one general aspect, the cognitive self-healing system for managing operation of a distributed computing environment may comprise a computer-implemented architecture including multiple specialized subsystems and services that interact via a network to provide automated detection and remediation of operational performance issues. A telemetry ingestion subsystem is configured to collect request-level telemetry data from a plurality of computing nodes of the distributed computing environment via one or more network interfaces. The telemetry data includes at least CPU utilization, memory utilization, network throughput metrics, and session-level user experience metrics, captured in real time or near-real time from processes executing on the computing nodes.

The system further comprises a dual-zone data lake that serves as a centralized storage facility for telemetry data. The data lake includes a raw data zone, which stores unprocessed telemetry data in a time-series format to preserve full fidelity for subsequent processing, and a curated data zone, which stores feature-engineered datasets derived from the unprocessed telemetry data. Feature-engineering may include, for example, normalization, aggregation, statistical transformation, dimensionality reduction, and computation of derived performance metrics. The curated data zone is indexed to support low-latency queries by machine learning models executing as part of the system's analytics workflows. As used herein, a "dual-zone" data lake may refer to a storage architecture partitioned by temperature tier (e.g., hot vs. warm/cold) and/or by data processing stage (e.g., raw vs. curated), with these dimensions optionally combined so that raw datasets may reside in a high-performance hot zone and curated datasets may be organized in an indexed structure for low-latency access.

A machine learning engine, comprising one or more trained machine learning models, operates on the curated datasets stored in the curated data zone to identify operational performance issues within the distributed computing environment. The models may include, for example, transformer-based anomaly detection models, graph neural networks, recurrent neural networks, and reinforcement learning agents, trained on a combination of historical telemetry data, synthetic workload data, and simulated fault data stored in the dual-zone data lake. Upon identifying an operational performance issue, the machine learning engine generates a remediation directive. The remediation directive is a digitally signed, machine-readable set of executable instructions that specifies a modification to a computing environment configuration state of the distributed computing environment. The computing environment configuration state may encompass operational parameters of computing nodes, hardware resource allocations, software service settings, and network path parameters.

An agent orchestration service is configured to verify a digital signature of the remediation directive against a stored public key to ensure authenticity and integrity of the directive prior to execution. Upon verification, the agent orchestration service instantiates a plurality of specialized autonomous software agents, each configured to execute a respective portion of the modification to the computing environment configuration state. The orchestration service coordinates execution of these agents across the plurality of computing nodes to implement the remediation in a distributed and synchronized manner. In certain embodiments, a remediation directive is cryptographically authenticated by associating it with a digital signature generated using a private key, wherein the system verifies the authenticity of the directive by validating the digital signature against a corresponding stored public key prior to instantiating the autonomous software agents.

A feedback collection subsystem is configured to collect updated telemetry data and performance metrics during and after execution of the modification specified by the remediation directive. These updates may include changes in system throughput, latency, error rates, and resource utilization, as well as fine-grained telemetry reflecting the immediate and long-term impact of the modification. A model retraining pipeline, implemented as an automated workflow, uses the updated telemetry data and performance metrics to update the one or more machine learning models of the machine learning engine. The retraining pipeline may adjust model weights, hyperparameters, and feature selection criteria to improve the accuracy and reliability of future identification of operational performance issues and the generation of corresponding remedial actions.

In another general aspect, the present invention is directed to a computer-implemented cognitive self-healing system for managing operation of a distributed computing environment. The system comprises a computer system comprising one or more computing nodes, each of the one or more computing nodes comprising at least one processor and a memory storing instructions for execution by the at least one processor, wherein the instructions, when executed, cause the computer system to: monitor requests within the distributed computing environment and collect telemetry data associated with the requests; analyze the telemetry data, using a machine learning process comprising one or more machine learning models, to identify operational performance issues in the distributed computing environment based on learned patterns from prior telemetry data; generate a remediation directive in response to the identified operational performance issues, the remediation directive comprising a machine-readable set of executable instructions specifying a modification to a computing environment configuration state of the distributed computing environment; instantiate one or more autonomous software agents in response to the remediation directive, the one or more autonomous software agents collectively being configured to perform the modification to the computing environment configuration state of the distributed computing environment; execute, via the one or more autonomous software agents, the modification to the computing environment configuration state of the distributed computing environment; collect outcome data, comprising updated telemetry data and performance metrics, resulting from the modification to the computing environment configuration state of the distributed computing environment; and update the one or more machine learning models of the machine learning process based on the outcome data to improve future identification of operational performance issues and corresponding remedial actions for the distributed computing environment.

A computer-implemented method for managing operation of a distributed computing environment according to embodiments of the present invention comprises the steps of: monitoring, by a computer system comprising one or more computing nodes, requests within the distributed computing environment and collecting telemetry data associated with the requests; analyzing, by the computing system, the telemetry data, using a machine learning process comprising one or more machine learning models, to identify operational performance issues in the distributed computing environment based on learned patterns from prior telemetry data; generating, by the computing system, in response to the identified operational performance issues, a remediation directive comprising a machine-readable set of executable instructions specifying a modification to a computing environment configuration state of the distributed computing environment; instantiating, by the computing system, in response to the remediation directive, one or more autonomous software agents collectively configured to perform the modification to the computing environment configuration state of the distributed computing environment; executing, via the one or more autonomous software agents, the modification to the computing environment configuration state of the distributed computing environment; collecting, by the computing system, outcome data, comprising updated telemetry data and performance metrics, resulting from the modification to the computing environment configuration state of the distributed computing environment; and updating, by the computing system, the one or more machine learning models of the machine learning process based on the outcome data to improve future identification of operational performance issues and corresponding remedial actions for the distributed computing environment.

In various implementations, the telemetry data comprises CPU utilization, memory utilization, network throughput metrics, and session-level user experience metrics.

In various implementations, each of the one or more machine learning models comprises at least one of a transformer-based anomaly detection model, a graph neural network model, a recurrent neural network model, or a reinforcement learning model; and each of the one or more machine learning models are trained using a combination of historical telemetry data, synthetic workload data, and simulated fault data.

In various implementations, the computing environment configuration state comprises operational parameters of computing nodes, hardware resource allocations, software service settings, and network path parameters.

In various implementations, the remediation directive comprises a machine-readable set of executable instructions specifying at least one of: an adjustment of hardware resource allocations, a modification of software service configurations, an alteration to network path parameters, or a migration of workloads among computing nodes of the distributed computing environment.

In various implementations, the computer system is configured to generate the remediation directive in response to the identified operational performance issues upon a confidence score output by the one or more machine learning models exceeding a predefined threshold.

In various implementations, the computer system is configured to instantiate the one or more autonomous software agents by instantiating specialized agents each configured to execute a different portion of the modification to the computing environment configuration state.

In various implementations, the system is further configured to authenticate the remediation directive prior to instantiating the one or more autonomous software agents by verifying a digital signature associated with the remediation directive against a stored public key.

In various implementations, the outcome data comprises updated telemetry data collected during and after execution of the modification to the computing environment configuration state.

In various implementations, the outcome data comprises performance metrics indicative of changes in system throughput, latency, error rates, and resource utilization resulting from execution of the modification to the computing environment configuration state.

The foregoing description illustrates specific embodiments of the invention and provides examples for enabling those skilled in the art to practice the invention. These embodiments are not intended to be exhaustive or to limit the invention to the precise forms disclosed. In particular, it will be understood that the computing nodes, distributed computing environments, telemetry ingestion pipelines, data lake architectures, machine learning processes, agent orchestration mechanisms, and feedback loops described herein may be implemented in a variety of hardware and software configurations without departing from the scope of the invention. The invention may be practiced in cloud-based, on-premises, hybrid, or edge computing environments, and may employ heterogeneous computing resources interconnected by one or more networks.

What is claimed is:

1. A computer-implemented cognitive self-healing system for managing operation of a distributed computing environment, the system comprising:

a dual-zone data lake comprising a raw data zone that stores unprocessed telemetry data in a time-series format, and a curated data zone that stores feature-engineered datasets derived from the unprocessed telemetry data, wherein the curated data zone is indexed to support low-latency queries by machine learning models; and a computer system in communication with the dual-zone data lake, wherein the computer system comprises one or more computing nodes, each of the one or more computing nodes comprising at least one processor and a memory storing instructions for execution by the at least one processor, wherein the instructions, when executed, cause the computer system to:

monitor requests within the distributed computing environment and collect telemetry data associated with the requests;

analyze the telemetry data, using a machine learning process comprising one or more machine learning models trained on historical telemetry data, synthetic workload data, and simulated fault data stored in the dual-zone data lake, to identify operational performance issues in the distributed computing environment based on curated datasets stored in the curated data zone and learned patterns from the historical telemetry data, the synthetic workload data, and the simulated fault data stored in the dual-zone data lake;

generate a remediation directive in response to the identified operational performance issues, the remediation directive comprising a machine-readable set of executable instructions specifying a modification to a computing environment configuration state of the distributed computing environment;

instantiate one or more autonomous software agents in response to the remediation directive, the one or more autonomous software agents collectively being configured to perform the modification to the computing environment configuration state of the distributed computing environment;

execute, via the one or more autonomous software agents, the modification to the computing environment configuration state of the distributed computing environment;

collect outcome data, comprising updated telemetry data and performance metrics, resulting from the modification to the computing environment configuration state of the distributed computing environment; and update the one or more machine learning models of the machine learning process based on the outcome data to improve future identification of operational performance issues and corresponding remedial actions for the distributed computing environment.

2. The system of claim 1, wherein the telemetry data comprises CPU utilization, memory utilization, network throughput metrics, and session-level user experience metrics.

3. The system of claim 1, wherein:

each of the one or more machine learning models comprises at least one of a transformer-based anomaly detection model, a graph neural network model, a recurrent neural network model, or a reinforcement learning model; and each of the one or more machine learning models are trained using a combination of historical telemetry data, synthetic workload data, and simulated fault data.

4. The system of claim 1, wherein the computing environment configuration state comprises operational parameters of computing nodes, hardware resource allocations, software service settings, and network path parameters.

5. The system of claim 1, wherein the remediation directive comprises a machine-readable set of executable instructions specifying at least one of: an adjustment of hardware resource allocations, a modification of software service configurations, an alteration to network path parameters, or a migration of workloads among computing nodes of the distributed computing environment.

6. The system of claim 1, wherein the computer system is configured to generate the remediation directive in response to the identified operational performance issues upon a confidence score output by the one or more machine learning models exceeding a predefined threshold.

7. The system of claim 1, wherein the computer system is configured to instantiate the one or more autonomous software agents by instantiating specialized agents each configured to execute a different portion of the modification to the computing environment configuration state.

8. The system of claim 1, wherein the system is further configured to authenticate the remediation directive prior to instantiating the one or more autonomous software agents by verifying a digital signature associated with the remediation directive against a stored public key.

9. The system of claim 1, wherein the outcome data comprises updated telemetry data collected during and after execution of the modification to the computing environment configuration state.

10. The system of claim 1, wherein the outcome data comprises performance metrics indicative of changes in system throughput, latency, error rates, and resource utilization resulting from execution of the modification to the computing environment configuration state.

11. A computer-implemented method for managing operation of a distributed computing environment, the distributed computing environment comprising a raw data zone that stores unprocessed telemetry data in a time-series format, and a curated data zone that stores feature-engineered datasets derived from the unprocessed telemetry data, wherein the curated data zone is indexed to support low-latency queries by machine learning models, the method comprising: training, by a computer system comprising one or more computing nodes, one or more machine learning models based on historical telemetry data, synthetic workload data, and simulated fault data stored in a dual-zone data lake; monitoring, by the computer system, requests within the distributed computing environment and collecting telemetry data associated with the requests; analyzing, by the computing system, the telemetry data, using a machine learning process comprising the one or more machine learning models, to identify operational performance issues in the distributed computing environment based on curated datasets stored in the curated data zone and learned patterns from the historical telemetry data; analyzing, by the computing system, using the machine learning process comprising the one or more machine learning models, curated datasets stored in the curated data zone to identify operational performance issues in the distributed computing environment; generating, by the computing system, in response to the identified operational performance issues, a remediation directive comprising a machine-readable set of executable instructions specifying a modification to a computing environment configuration state of the distributed computing environment; instantiating, by the computing system, in response to the remediation directive, one or more autonomous software agents collectively configured to perform the modification to the computing environment configuration state of the distributed computing environment; executing, via the one or more autonomous software agents, the modification to the computing environment configuration state of the distributed computing environment; collecting, by the computing system, outcome data, comprising updated telemetry data and performance metrics, resulting from the modification to the computing environment configuration state of the distributed computing environment; and updating, by the computing system, the one or more machine learning models of the machine learning process based on the outcome data to improve future identification of operational performance issues and corresponding remedial actions for the distributed computing environment.

12. The method of claim 11, wherein the telemetry data comprises CPU utilization, memory utilization, network throughput metrics, and session-level user experience metrics.

13. The method of claim 11, wherein the one or more machine learning models comprise a transformer-based anomaly detection model, a graph neural network model, a recurrent neural network model, a reinforcement learning model, or any combination thereof, and wherein the one or more machine learning models are trained using a combination of historical telemetry data, synthetic workload data, and simulated fault data.

14. The method of claim 11, wherein the computing environment configuration state comprises operational parameters of computing nodes, hardware resource allocations, software service settings, and network path parameters.

15. The method of claim 11, wherein the remediation directive comprises a machine-readable set of executable instructions specifying an adjustment of hardware resource allocations, a modification of software service configurations, an alteration of network path parameters, or a migration of workloads among computing nodes of the distributed computing environment.

16. The method of claim 11, further comprising generating, by the computing system, the remediation directive in response to the identified operational performance issues upon a confidence score output by the one or more machine learning models exceeding a predefined threshold.

17. The method of claim 11, wherein instantiating the one or more autonomous software agents comprises instantiating specialized agents each configured to execute a different portion of the modification to the computing environment configuration state.

18. The method of claim 11, further comprising authenticating, by the computing system, the remediation directive prior to instantiating the one or more autonomous software agents by verifying a digital signature associated with the remediation directive against a stored public key.

19. The method of claim 11, wherein the outcome data comprises updated telemetry data collected during and after execution of the modification to the computing environment configuration state, the updated telemetry data including performance metrics indicative of changes in system throughput, latency, error rates, and resource utilization.

20. A computer-implemented cognitive self-healing system for managing operation of a distributed computing environment, the system comprising:

a telemetry ingestion subsystem configured to collect request-level telemetry data, including CPU utilization, memory utilization, network throughput metrics, and session-level user experience metrics, from a plurality of computing nodes of the distributed computing environment;

a dual-zone data lake comprising:

a raw data zone configured to store unprocessed telemetry data in a time-series format; and a curated data zone configured to store feature-engineered datasets derived from the unprocessed telemetry data, the curated data zone being indexed to support low-latency queries by machine learning models;

a machine learning engine comprising one or more machine learning models trained on historical telemetry data, synthetic workload data, and simulated fault data stored in the dual-zone data lake, the machine learning engine configured to:

analyze curated datasets stored in the curated data zone to identify operational performance issues in the distributed computing environment; and generate a remediation directive comprising a digitally signed, machine-readable set of executable instructions specifying a modification to a computing environment configuration state of the distributed computing environment;

an agent orchestration service configured to:

verify a digital signature of the remediation directive against a stored public key;

instantiate a plurality of specialized autonomous software agents, each configured to execute a different portion of the modification to the computing environment configuration state; and coordinate execution of the plurality of specialized autonomous software agents across the plurality of computing nodes;

a feedback collection subsystem configured to collect updated telemetry data and performance metrics during and after execution of the modification; and a model retraining pipeline configured to update the one or more machine learning models of the machine learning engine based on the updated telemetry data and performance metrics.

* * * * *